(12) United States Patent
Plourde, Jr. et al.

(10) Patent No.: US 7,218,839 B2
(45) Date of Patent: May 15, 2007

(54) MANAGEMENT OF TELEVISION PRESENTATION RECORDINGS

(75) Inventors: Harold J. Plourde, Jr., Lawrenceville, GA (US); Mark S. Adams, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 643 days.

(21) Appl. No.: 10/073,689

(22) Filed: Feb. 11, 2002

(65) Prior Publication Data

US 2003/0154484 A1    Aug. 14, 2003

(51) Int. Cl.
*H04N 5/91* (2006.01)
(52) U.S. Cl. .......................... 386/83; 386/45; 386/46; 386/125; 386/126; 386/83; 348/731; 348/734
(58) Field of Classification Search ................. 386/46, 386/83, 94–95, 96, 1, 45; 725/39–55, 21; 348/731
See application file for complete search history.

(56) References Cited

U.S. PATENT DOCUMENTS

| | | | |
|---|---|---|---|
| 4,706,121 A | 11/1987 | Young | 358/142 |
| 4,751,578 A | 6/1988 | Reiter et al. | 358/183 |
| 4,847,696 A | 7/1989 | Matsumoto et al. | 358/335 |
| 4,908,713 A | 3/1990 | Levine | 358/335 |
| 4,963,994 A | 10/1990 | Levine | 358/335 |
| 5,038,211 A | 8/1991 | Hallenbeck | 358/142 |
| 5,253,066 A | 10/1993 | Vogel | 358/188 |
| 5,293,357 A | 3/1994 | Hallenbeck | 348/734 |
| 5,353,121 A | 10/1994 | Young et al. | 348/563 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,598,523 A | 1/1997 | Fujita | 395/352 |
| 5,809,204 A | 9/1998 | Young et al. | 386/83 |
| 5,850,218 A | 12/1998 | LaJoie et al. | 345/327 |
| 5,915,068 A | 6/1999 | Levine | 386/83 |
| 6,177,931 B1 * | 1/2001 | Alexander et al. | 725/52 |
| 6,240,240 B1 * | 5/2001 | Nagano et al. | 386/83 |
| 6,243,142 B1 | 6/2001 | Mugura et al. | 348/564 |
| 6,311,011 B1 | 10/2001 | Kuroda | 386/46 |
| 6,370,317 B2 | 4/2002 | Nagano et al. | 386/83 |
| 6,442,327 B1 | 8/2002 | Yamada et al. | 386/46 |
| 6,481,011 B1 * | 11/2002 | Lemmons | 725/47 |
| 6,642,939 B1 * | 11/2003 | Vallone et al. | 345/721 |
| 6,756,997 B1 * | 6/2004 | Ward et al. | 345/716 |
| 6,832,385 B2 * | 12/2004 | Young et al. | 725/39 |

* cited by examiner

*Primary Examiner*—Thai Q. Tran
*Assistant Examiner*—Jamie Jo Vent

(57) ABSTRACT

A method for managing television presentation recordings includes determining if a television presentation corresponding to a television presentation listing is scheduled to be recorded, assigning a color to the television presentation listing responsive to determining that the television presentation is scheduled to be recorded, and presenting the television presentation listing to a user.

45 Claims, 17 Drawing Sheets

| | 1701 | 1702 | 1703 | 1704 |
|---|---|---|---|---|
| | Program | Channel | Time | Date |
| 1705 | College Basketball | ESPN 98 | 7:00 P.M to 9:00 P.M. | Thursday 1/17/2002 |
| 1706 | Rivera Live | CNBC 99 | 7:00 P.M to 8:00 P.M. | Thursday 1/17/2002 |
| 1709 | ABC News | ABC 2 | 7:00 P.M to 7:30 P.M. | Thursday 1/17/2002 |
| 1707 | Jeopardy | NBC 4 | 7:30 P.M to 8:00 P.M. | Thursday 1/17/2002 |
| 1708 | Friends | NBC 4 | 8:00 P.M to 8:30 P.M. | Thursday 1/17/2002 |
| 1710 | Friends | NBC 4 | 8:00 P.M to 8:30 P.M. | Thursday 1/24/2002 |
| 1711 | Jeopardy | NBC 4 | 7:30 P.M to 8:00 P.M. | Thursday 1/24/2002 |

FIG. 17

MANAGEMENT OF TELEVISION PRESENTATION RECORDINGS

FIELD OF THE INVENTION

This invention relates in general to television systems, and more particularly, to the field of subscriber television systems.

BACKGROUND OF THE INVENTION

Cable television systems are now capable of providing many services in addition to analog broadcast video. In implementing enhanced programming, the home communication terminal ("HCT"), otherwise known as the settop box, has become an important computing device for accessing various video services. In addition to supporting traditional analog broadcast video functionality, digital HCTs (or "DHCTs") now also support an increasing number of two-way digital services such as video-on-demand.

A DHCT is typically connected to a cable or satellite television network and includes hardware and software necessary to provide various services and functionality. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

Services provided by a DHCT may include an interactive program guide (IPG) that provides listings of television presentations that are available via the DHCT. A user may be able to request a television presentation by selecting a corresponding listing. Some IPGs provide color coded listings that identify the theme of the corresponding television presentation. For example, listings for sports presentations may have green backgrounds, listings for news programs may have red backgrounds, and listings for movies may have purple backgrounds.

Some DHCTs are also equipped to record and/or to schedule the recording of television presentations. The recording may be achieved via a storage device that uses electronic, magnetic, or optical recording media. The storage device may be incorporated into a DHCT or may be a separate unit. Recordings may be scheduled manually by a user or may be scheduled automatically by the DHCT based on a user's previous viewing and/or recording habits, or based on a user's expressed viewing preferences.

Problems that may arise in DHCT recording systems include limited storage capacity and time conflicts between two or more programs that are scheduled to be recorded. A time conflict may cause a scheduled program that is desired by a user to not be recorded. Limited storage capacity may cause a previously recorded television presentation that is desired by a user to be automatically deleted or may cause a scheduled program to not be recorded. Other problems include users forgetting to schedule television presentation recordings or erroneously canceling recordings that were scheduled by other household members. Therefore, there exists a need for systems and methods that address these and/or other problems associated with the recording of television presentations.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 17 depicts a non-limiting example of a PVR recording listing screen that may be provided by the DHCT depicted in FIG. 2.

DETAILED DESCRIPTION OF THE PREFERRED EMBODIMENTS

The preferred embodiments of the present invention now will be described more fully hereinafter with reference to the accompanying drawings. These embodiments are examples, among others, of systems and methods of the present invention. Therefore, the present invention, which may be embodied in many different forms, should not be construed as limited to the embodiments set forth herein. One embodiment of the present invention implements color coding in an IPG to provide users with information related to television presentations that are scheduled to be recorded ("scheduled recordings"). The information provided by the color coding may identify scheduled recordings, how the recordings were scheduled, and/or any related time or storage capacity conflicts, as will be discussed in more detail below. In this manner, among other uses, a user is able to quickly and easily determine which television presentations the user may schedule for recording without creating a recording conflict, and which scheduled recordings the user may cancel in order to resolve a recording conflict. Furthermore, identifying scheduled recording via color coding IPG listings allows recording conflicts to be brought to a user's attention on a frequent and timely basis, and therefore reduces the likelihood that recording conflicts will go unresolved by the user.

Figure 1:
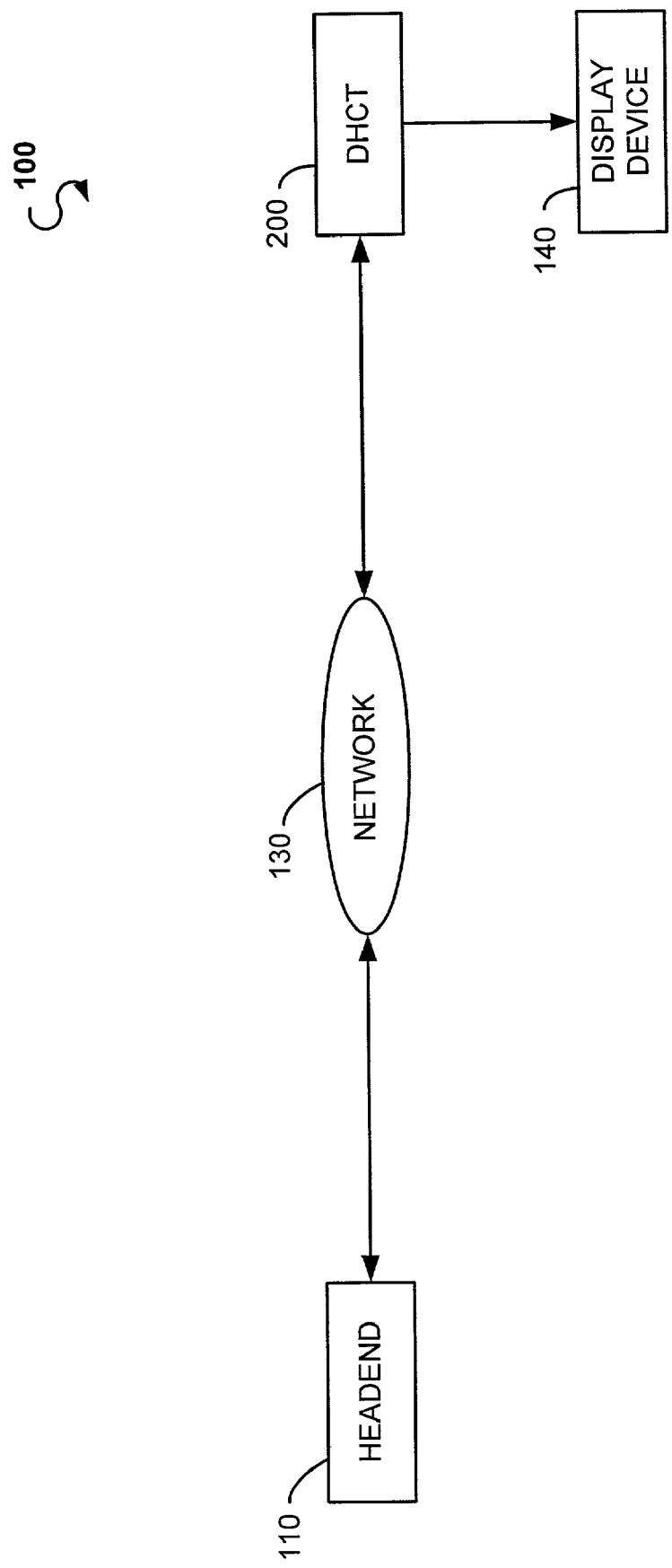
FIG. 1 is a block diagram depicting a non-limiting example of a television services system.

FIG. 1 is a block diagram depicting a non-limiting example of a television services system 100. In this example, the television services system 100 includes a headend 110 and a DHCT 200 that are coupled via a network 130. The DHCT 200 is typically situated at a user's residence or place of business and may be a stand-alone unit or integrated into another device such as, for example, a display device 140 or a personal computer (not shown). The DHCT 200 receives signals (video, audio and/or other data) from the headend 110 through the network 130 and provides any reverse information to the headend 110 through the network 130. The network 130 may be any suitable means for communicating television services data including, for example, a cable television network, a public switched telephone network (PSTN), a satellite communication network, the internet, etc. The headend 110 may include one or more server devices (not shown) for providing video, audio, and textual data to client devices such as DHCT 200. The headend 110 and the DHCT 200 cooperate to provide a user with television services including, for example, broadcast television, an interactive program guide (IPG), and/or video-on-demand (VOD) presentations. The television services are provided via the display device 140 which is typically a television. However, the display device 140 may also be any other device capable of displaying video images including, for example, a computer monitor.

Figure 2:
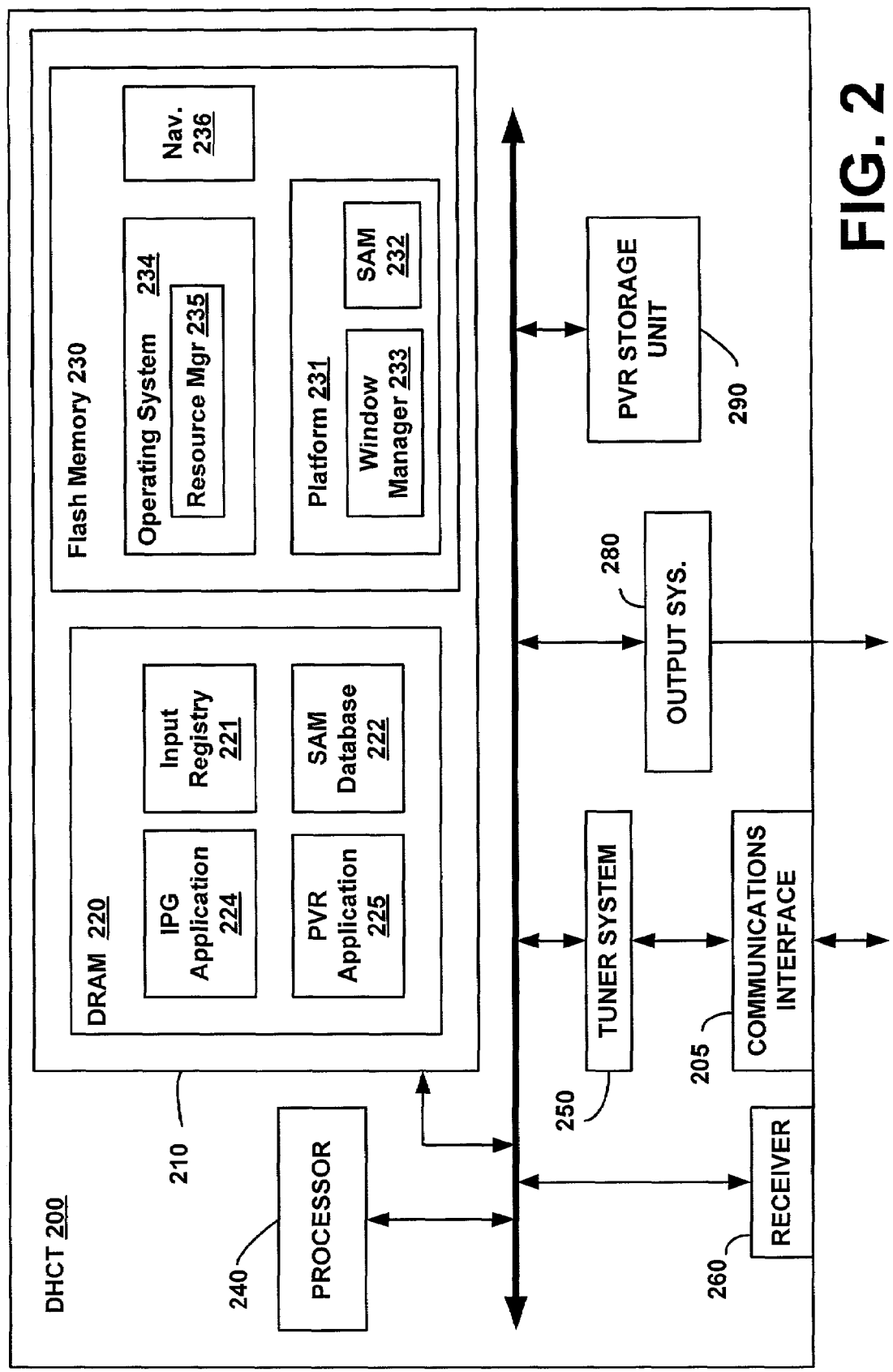
FIG. 2 is a block diagram depicting a non-limiting example of the internal configuration of the DHCT depicted in FIG. 1.

FIG. 2 is a block diagram depicting a non-limiting example of a DHCT 200. The DHCT 200 described herein is merely illustrative and should not be construed as implying any limitations upon the scope of the present invention. The DHCT 200 includes a communications interface 205 for receiving signals (video, audio and/or other data) from the headend 110, at least one processor 240 for controlling operations of the DHCT 200, an output system 280 for driving the display device 140, and a tuner system 250 for tuning to a particular television channel to be displayed. The tuner system 250 includes, in one implementation, an out-of-band tuner for bi-directional quadrature phase shift keying (QPSK) data communication and a quadrature amplitude modulation (QAM) tuner for receiving television signals. A receiver 260 receives externally-generated user inputs or commands from an input device such as, for example, a remote control device.

The DHCT 200 may include one or more wireless or wired interfaces (not shown), also called ports, for receiving and/or transmitting data to other devices. For instance, the DHCT 200 may feature a USB (Universal Serial Bus), an Ethernet port (for connection to a computer), an IEEE-1394 connection (for connecting to consumer electronics equipment), a serial port, a parallel port, a radio frequency (RF) interface, and/or an infra-red (IR) interface. In this manner, user inputs may be provided via, for example, a personal computer, buttons or keys located on the exterior of the DHCT 200, a hand-held remote control device, and/or a keyboard that includes user-actuated keys, etc.

The DHCT 200 also includes a personal video recorder (PVR) storage unit 290 for recording television presentations. The PVR storage unit 290 may incorporate electronic, magnetic, optical, and/or other types of storage media for storing audio-visual data corresponding to television presentations. Although shown as residing within the DHCT 200, the PVR storage unit 290 may alternatively be located outside the DHCT 200 and coupled thereto using a wired or wireless connection.

System memory 210 includes flash memory 230 and dynamic random access memory (DRAM) 220 for storing various applications, modules and data for execution and use by the processor 240. Basic functionality of the DHCT 200 is provided by an operating system 234 that is primarily stored in flash memory 230. The operating system 234 includes at least one resource manager 235 that provides an interface to and coordination of resources of the DHCT 200 such as, for example, computing resources.

One or more programmed software applications, herein referred to as applications, are executed by utilizing the computing resources in the DHCT 200. Applications stored in flash memory 230 or DRAM 220 are executed by processor 240 under the auspices of the operating system 234. Data required as input by an application is stored in DRAM 220 or flash memory 230 and read by processor 240 as needed during the course of the application's execution. Input data may be data stored in DRAM 220 by a secondary application or other source, either internal or external to the DHCT 200, or possibly anticipated by the application and thus created with the application at the time it was generated as a software application, in which case it is stored in flash memory 230. Data generated by an application is stored in DRAM 220 by processor 240 during the course of the application's execution.

An application referred to as navigator 236 is also resident in flash memory 230 and provides a navigation framework for services provided by the DHCT 200. The navigator 236 registers for and in some cases reserves certain user inputs related to navigational keys such as television channel up/down, last television channel, favorite television channel, etc. The client applications may be resident in flash memory 230 or downloaded into DRAM 220.

The flash memory 230 also contains a platform library 231. The platform library 231 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs)

as necessary so that each application does not have to contain these utilities. Two components of the platform library 231 that are shown in FIG. 2 are a window manager 233 and a service application manager (SAM) client 232.

The window manager 233 provides a mechanism for implementing the sharing of the screen regions and user input. The window manager 233 is also responsible for, as directed by one or more applications, implementing the creation, display, and allocation of the limited DHCT 200 screen resources. Window manager 233 allows multiple applications to share the screen by assigning ownership of screen regions, or windows. Window manager 233 communicates with resource manager 235 to coordinate available resources (such as display memory) among different resource-consuming processes. Such processes may be directly or indirectly invoked by one or more applications.

The window manager 233 also maintains, among other things, a user input registry 221 in DRAM 220 so that when a user enters a key or a command via a remote control device or another input device such as a keyboard or mouse, the user input registry 221 may be accessed to determine which of various applications running on the DHCT 200 should receive data corresponding to the input key and in which order. As an application is executed, it registers a request to receive certain user input keys or commands. When the user presses a key corresponding to one of the commands on the remote control device, the command is received by the receiver 260 and relayed to the processor 240. The processor 240 dispatches the event to the operating system 234 where it is forwarded to the window manager 233. The window manager 233 then accesses the user input registry 221 and routes data corresponding to the incoming command to the appropriate application.

The SAM client 232 is a client component of a client-server pair of components, with the server component being located on the headend 110 (FIG. 1). A SAM database 222 in DRAM 220 includes a data structure of services and a data structure of television channels that are created and updated by the headend 110. Many television services can be defined using the same application component, with different parameters. Television services include, without limitation and in accordance with one implementation, the presentation of television broadcast programs, video-on-demand (VOD), and interactive program guides (IPG). In general, the identification of a service includes the identification of an executable application that provides the service along with a set of application-dependent parameters that indicate to the application the service to be provided. As a non-limiting example, a service of presenting a television broadcast could be executed with a set of parameters to view HBO or with a separate set of parameters to view CNN. Each association of the application component (tune video) and one parameter component (HBO or CNN) represents a particular service that has a unique service I.D.

Application clients can be downloaded into DRAM 220 at the request of the SAM client 232, typically in response to a request by the user or in response to a message from the headend. In this non-limiting example, DRAM 220 contains a PVR application 225 and an interactive program guide (IPG) application 224. It should be clear to one with ordinary skill in the art that these applications are not limiting and merely serve as examples for this present embodiment of the invention. Furthermore, one or more DRAM based applications may, as an alternative embodiment, be resident in flash memory 230. These applications, and others provided by a television services system operator, are software entities for providing services to the user.

In one implementation, applications executing on the DHCT 200 work with the navigator 236 by abiding by several guidelines. First, an application utilizes the SAM client 232 for the provision, activation, and suspension of services and service enhancements. Second, an application shares DHCT 200 resources with other applications and abides by the resource management policies of the SAM client 232, the operating system 234, and the DHCT 200. Third, an application conforms to situations where shared resources are only accessible via the navigator 236. Fourth, when an application loses service authorization while providing a service, the application suspends the service via the SAM client 232 (the navigator 236 will reactivate an individual service application when it later becomes authorized). Finally, an application client is designed to not have access to certain user input keys reserved by the navigator 236 (e.g., power, channel +/−, volume +/−, etc.).

Data and software used in providing a DHCT service to a user may be stored in one or more of the following memory resources: a data storage device located at a headend, a data storage device located at a customer premises, a non-volatile memory internal to the DHCT 200, and/or a hard drive internal to the DHCT 200. For example, an executable program or algorithm corresponding to an operating system (OS) component, or to a client platform component, or to a client application (e.g. IPG application 224), or to respective parts thereof, may reside in and/or execute out of DRAM 220 and/or flash memory 230, or may reside in a local storage device connected to DHCT 200 and may be transferred into DRAM 220 for execution. Likewise, data input for an executable program or algorithm may reside in DRAM 220 or in flash memory 230, or may reside in a local storage device connected to the DHCT 200 and may be transferred into DRAM 220 for use by an executable program or algorithm. In addition, data output by an executable program or algorithm may be written into DRAM 220 by the executable program or algorithm and may be transferred to flash memory 230 or to a local storage device for storage purposes. It should be noted, however, that the present invention is not limited by where or how any data and/or applications are stored or retrieved.

Each of the above mentioned applications preferably comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 3:
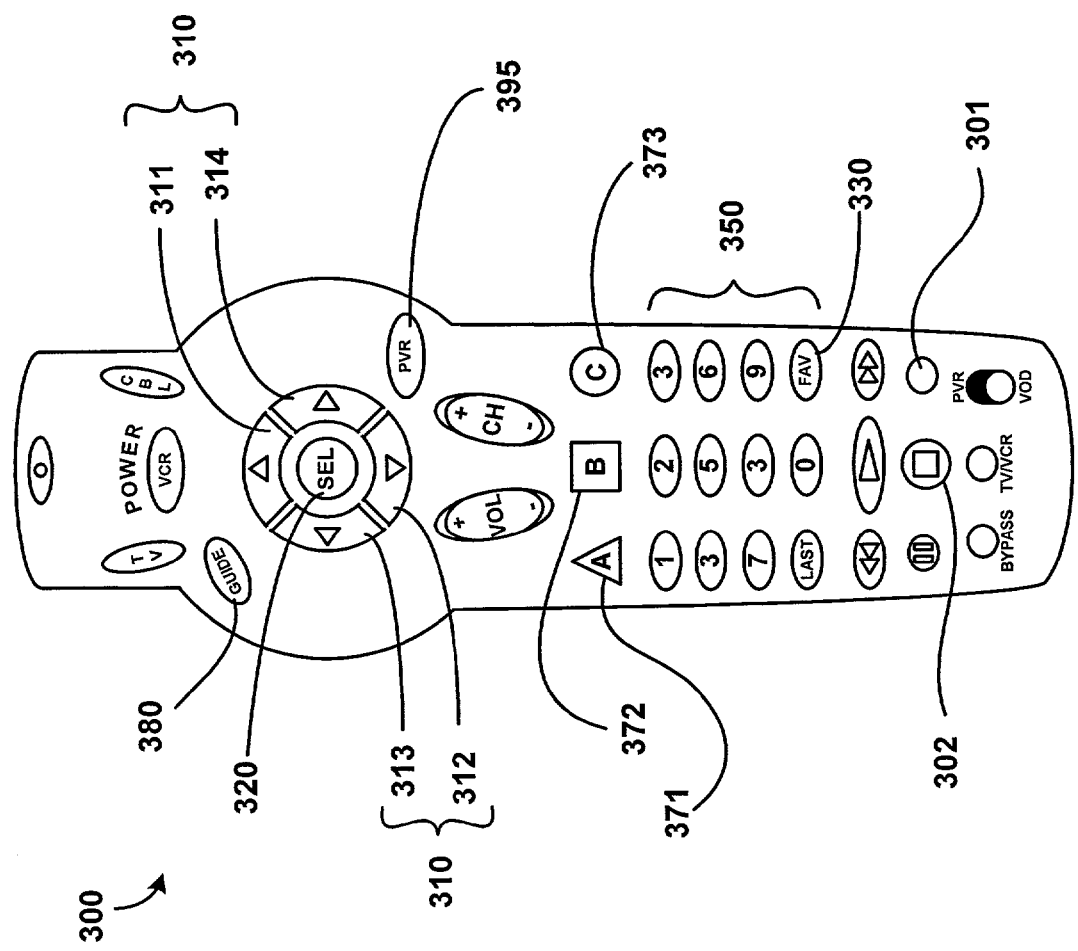
FIG. 3 depicts a non-limiting example of a remote control device that may be used to provide user input to the DHCT depicted in FIG. 2.
Figure 5:
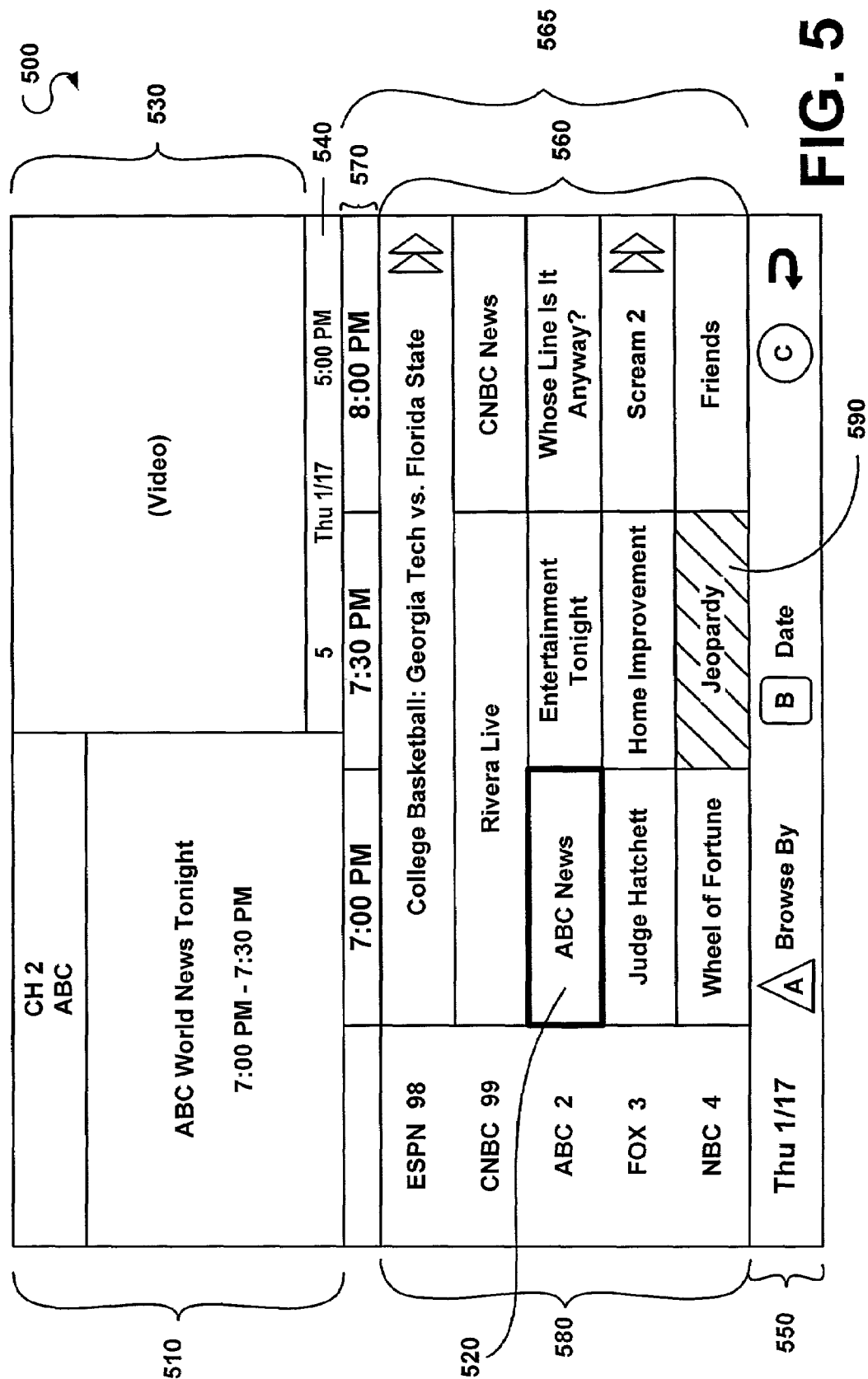
FIG. 5 depicts a non-limiting example of an IPG that may be presented by the DHCT depicted in FIG. 2.

FIG. 3 depicts a non-limiting example of a remote control device 300 that may be used to provide user input to the DHCT 200. The remote control device 300 described herein is merely illustrative and should not be construed as implying any limitations upon the scope of the present invention. Four arrow keys 310 are provided including an up arrow key 311, a down arrow key 312, a left arrow key 313, and a right arrow key 314. The arrow keys 310 can be used to scroll through on-screen options and/or to highlight an on-screen option, whereas a select key 320 may be used to select a currently highlighted option. A guide key 380 may be used to access a television program guide such as, for example, IPG 500 (FIG. 5). A PVR key 395 may be used to request a list of PVR recordings such as, for example, as illustrated in FIG. 17. The function of an "A" key 371, a "B" key 372, and a "C" key 373 varies depending on the screen being presented to a user at the time of a key's activation. In one embodiment, the "A" key 371 can be used to access a browse-by list for requesting an IPG screen that contains a subset of television presentations falling under a user selected browse-by category such as, for example, comedy, drama, action/adventure, sports, etc.; the "B" key 372 can be used to request an IPG screen containing program listings for a user selected date; and the "C" key 373 can be used to request an IPG that covers a time period that includes the current time.

In an alternative embodiment of the invention, different and/or additional systems and methods of providing user input may be used including, for example, a remote control device having different keys and/or key layouts, a keyboard device, a mouse, a voice activated input system, a touch-screen display, etc. The invention described herein is not limited by the type of device used to provide user input.

Figure 4:
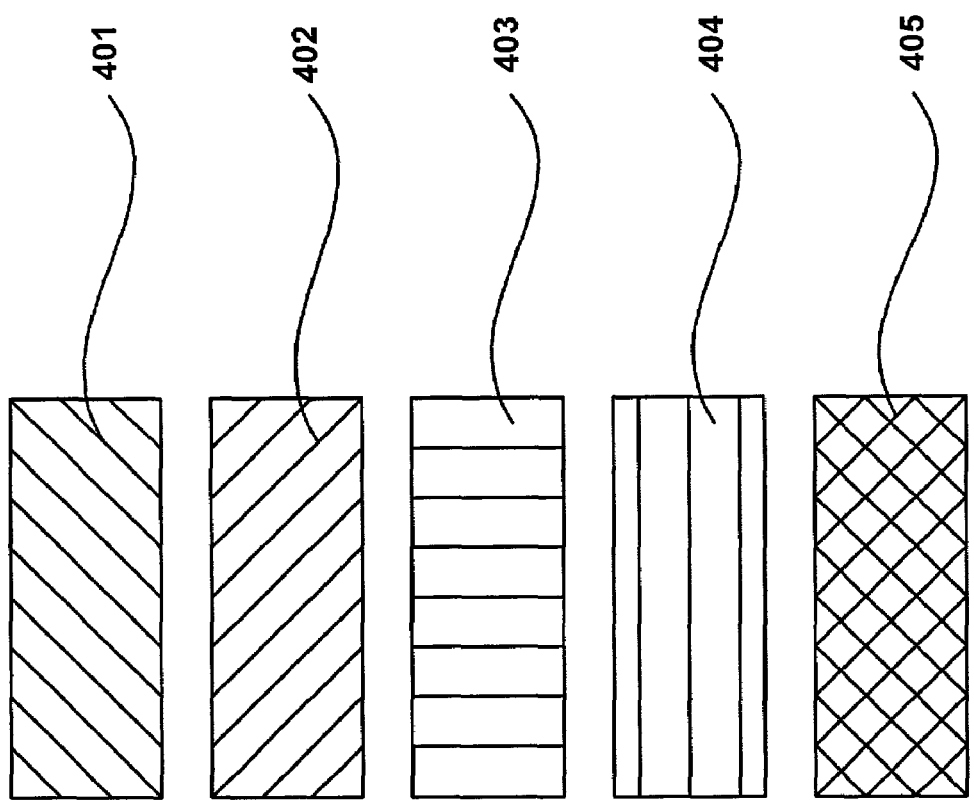
FIG. 4 depicts types of shading that will be used to depict various colors in FIGS. 5-6, and 10-12.

FIG. 4 shows types of shading that will be used to depict various colors in FIGS. 5-6, 10-12, and 17. Each type of shading represents a pre-determined color or combination of colors such as, for example, among others, red, white, blue, green, black, yellow, orange, purple, gold, silver, brown, pink, gray, or a combination thereof. The first type of shading 401 will be used to depict a First Color, the second type of shading 402 will be used to depict a Second Color, the third type of shading 403 will be used to depict a Third Color, the fourth type of shading 404 will be used to depict a Fourth Color, and the fifth type of shading 405 will be used to depict a Fifth Color. Each of the First Color, the Second Color, the Third Color, the Fourth Color, and the Fifth Color may be a single color or a combination of colors. The combination of colors may be in the form of a pattern such as, for example, striped, checkered, or spotted, or may comprise a color gradient. A background having a color gradient comprises a color that gradually changes over a display area. The combination of colors may also be in the form colors that change over time such as, for example, by blinking, scrolling, or fading. Furthermore, each type of shading represents a color or combination of colors that is distinguishable from each of the colors or combination of colors represented by another type of shading. A color or combination of colors may be distinguishable from another color or combination of colors based on factors that include hue, saturation, and/or luminance. As a non-limiting example, among others, a lighter green color may be used to identify a first recording characteristic, a darker green color may be used to identify a second recording characteristic, a striped red and green combination of colors may be used to identify a third recording characteristic, a checkered red and white combination of colors may be used to identify a fourth recording characteristic, and a gradient of blue colors may be used to identify a fifth recording characteristic. Embodiments of the invention are not, however, limited to any particular colors, combination of colors, or color schemes. Reference numerals corresponding to a type of shading will also be used herein to refer to a corresponding color. Therefore, the colors depicted by the types of shading 401-405 will also be assigned the reference numerals 401-405, respectively.

In one embodiment of the invention, each of the colors 401-405 are used in an IPG listing to signify a characteristic of a corresponding television presentation. A television presentation may be for example, a show, a program, a movie, or an event, among others, that is capable of being displayed via a television. An example of a meaning that may be associated with each color is as follows:

(a) The First Color 401 may be included in an IPG listing to signify that the listed program had been automatically scheduled to be recorded by the DHCT 200.

(b) The Second Color 402 may be included in an IPG listing to signify that the listed program had been explicitly scheduled to be recorded by a user.

(c) The Third Color 403 may be included in an IPG listing to signify that the listed program has a recording time conflict (i.e. another television presentation is scheduled to be recorded during a partially or fully overlapping time period).

(d) The Fourth Color 404 may be included in an IPG listing to signify a storage capacity conflict (i.e. that there may be insufficient storage capacity to record the listed program unless another program or part thereof is deleted prior to or during the recording of the listed program).

(e) The Fifth Color 405 may be included in an IPG listing to signify a recording time conflict and a storage capacity conflict.

With additional reference to FIGS. 1-4 throughout the remaining figure descriptions, FIG. 5 depicts a non-limiting example of an IPG screen 500 that illustrates an initial program guide arrangement in a time format. IPG screen 500 may be presented by the DHCT 200 (FIG. 2) in response to user input that is provided via, for example, the activation of the guide key 380 (FIG. 3). The top left portion of IPG screen 500 is a detailed focus area 510 that includes detailed television channel information for a currently highlighted program listing which, in the current example, is the ABC News® listing 520. The detailed channel information may include channel number, channel name, program name, program description, program duration, and/or any episode information or rating.

Video showing on the television channel to which the DHCT 200 is currently tuned (for which audio is also playing, and which is typically the program occupying the full screen before the user is presented with IPG screen 500) is displayed in a video area 530. Immediately below the video area 530 is an information banner 540 for displaying the television channel number to which the DHCT 200 is currently tuned (e.g., television channel 5), the current day and date (e.g., Thursday, January 17), and the current time (e.g., 5:00 p.m.).

An IPG grid 565 includes a main program display area 560, a time area 570, and a channel area 580. The main program display area 560 contains a listing of television presentation titles corresponding to television presentations that are or will be available for viewing during the time periods listed in the time area 570 via respective television channels identified in television channel area 580. The television channel area 580 includes a vertical list of television channels organized sequentially from top to bottom by increasing television channel number (except for the lowest numbered television channel which is typically listed immediately below the highest numbered television channel). In one embodiment, the arrow buttons 310 (FIG. 3) can be used to scroll through the main program display area 560 and to highlight a desired program. As a user scrolls in time across a calendar day boundary, the day and date indications displayed in various areas are automatically updated.

Though other implementations are contemplated within the scope of the present invention, when the IPG application is first activated by the user, the lowest numbered television channel listing in the television channel lineup is typically centered in the television channel area 580. In this non-limiting example, the lowest television channel in this television channel list displayed in the television channel area 580 is ABC (channel 2). Continuing with this non-limiting example, the left-most time column in the main program display area 560 includes titles of programs scheduled to be broadcast about two hours into the future with the middle title in the column being highlighted and corresponding to a program on the lowest numbered television channel. Therefore, in this example, the ABC News listing 520, which is scheduled be on the ABC channel (channel 2), is highlighted.

In an alternative embodiment, the left-most time column in the main program display area 560 corresponds to a time period that covers the current time. It should be noted that the current program shown in video area 530 and referenced in information banner 540, corresponds to a currently tuned television channel, which in this example is television channel 5, and not to the highlighted program ABC (channel 2). The bottom area 550 of IPG screen 500 indicates the selected day for which program data is being displayed as well as information about the current functions of the "A", "B", and "C" keys on the remote control 300.

In yet another embodiment, an IPG may have fewer, greater, or different components. For example, in one embodiment an IPG may not include the detailed focus area 510, the video area 530, the information banner 540, and/or the bottom area 550. In yet another embodiment, an IPG may have time listings that are arranged vertically and television channel listings that are arranged horizontally. One of ordinary skill in the art will understand that various IPG configurations are possible within the scope of the present invention.

In the example shown in FIG. 5, the background of the Jeopardy listing 590 has a First Color 401 that is used to signify that Jeopardy was automatically scheduled to be recorded. A program is typically automatically scheduled to be recorded where there is a substantial likelihood that a user may decide to view the program at a later time. Factors that may be used in determining whether a program is automatically scheduled to be recorded may include, for example, user preferences that were provided via user input, viewing behavior that is monitored by the DHCT 200, preference data collected from other users, and/or previous recordings scheduled by a user.

Figure 6:
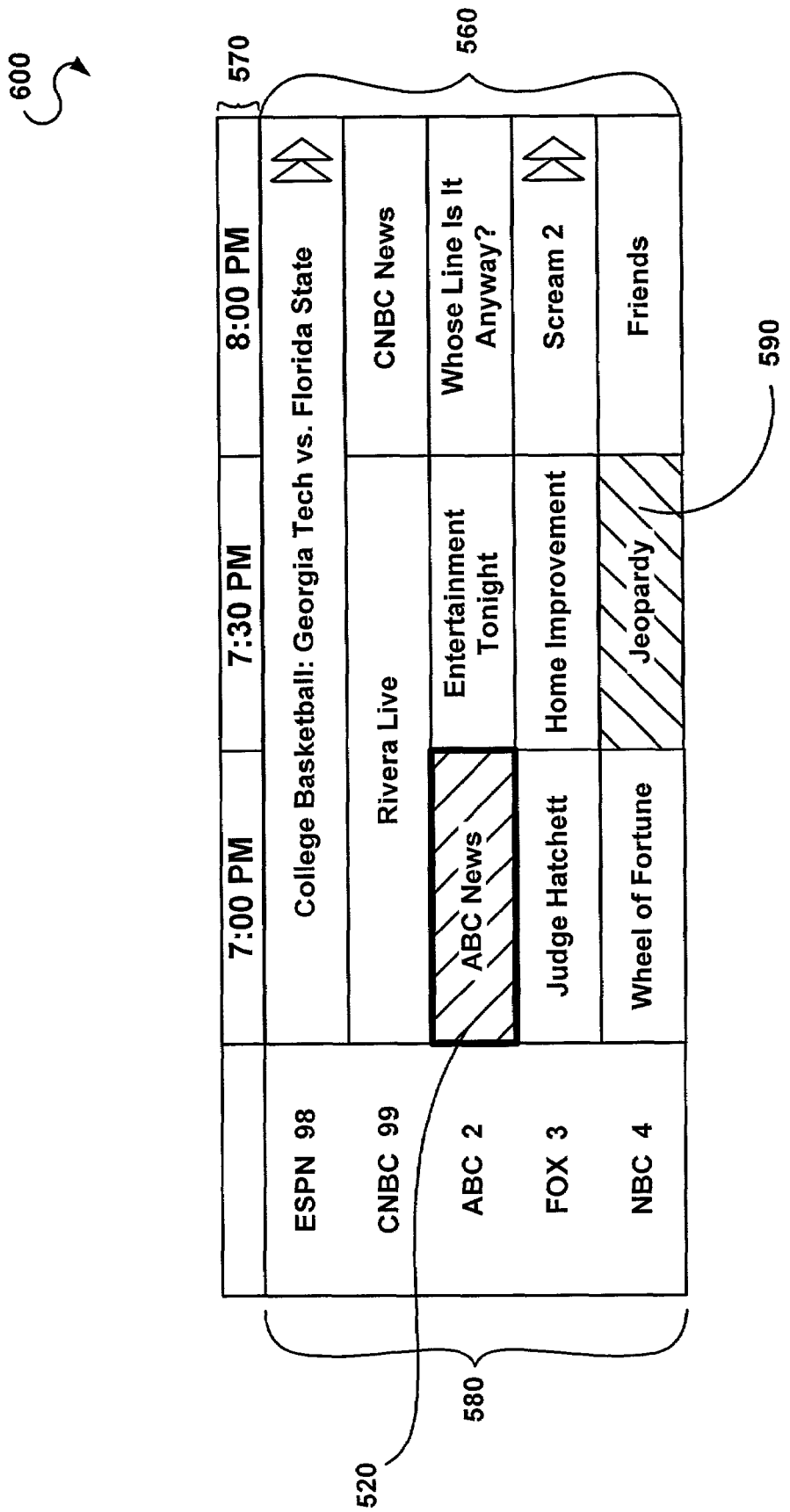
FIG. 6. depicts a non-limiting example of an IPG grid that is presented by the DHCT depicted in FIG. 2 showing that a recording had been scheduled by a user.

FIG. 6. depicts a non-limiting example of an IPG grid 600 that may be presented after the program identified as ABC News 520 is scheduled by a user to be recorded. The background of the ABC News listing 520 has a Second Color 402 (FIG. 4) that is used to signify that ABC News was expressly scheduled to be recorded by a user. As discussed above, the Second Color 402 is a color that is distinguishable from the First Color 401. A user may schedule the recording of ABC News by, for example, activating the record key 301 while the ABC News listing 520 is highlighted. A person of ordinary skill in the art will understand that there are many alternative methods of scheduling the recording of a television presentation within the scope of the present invention. For example, in one embodiment of the invention, a user may schedule the recording of a television presentation by using the number pad 350 to provide the necessary scheduling information while being presented with a banner or screen for scheduling the recording of a television presentation. The necessary scheduling information may include, for example, channel number, date, beginning time, and ending time. In another embodiment, a user may schedule the recording of a television presentation as discussed in reference to FIGS. 7-9.

Figure 7:
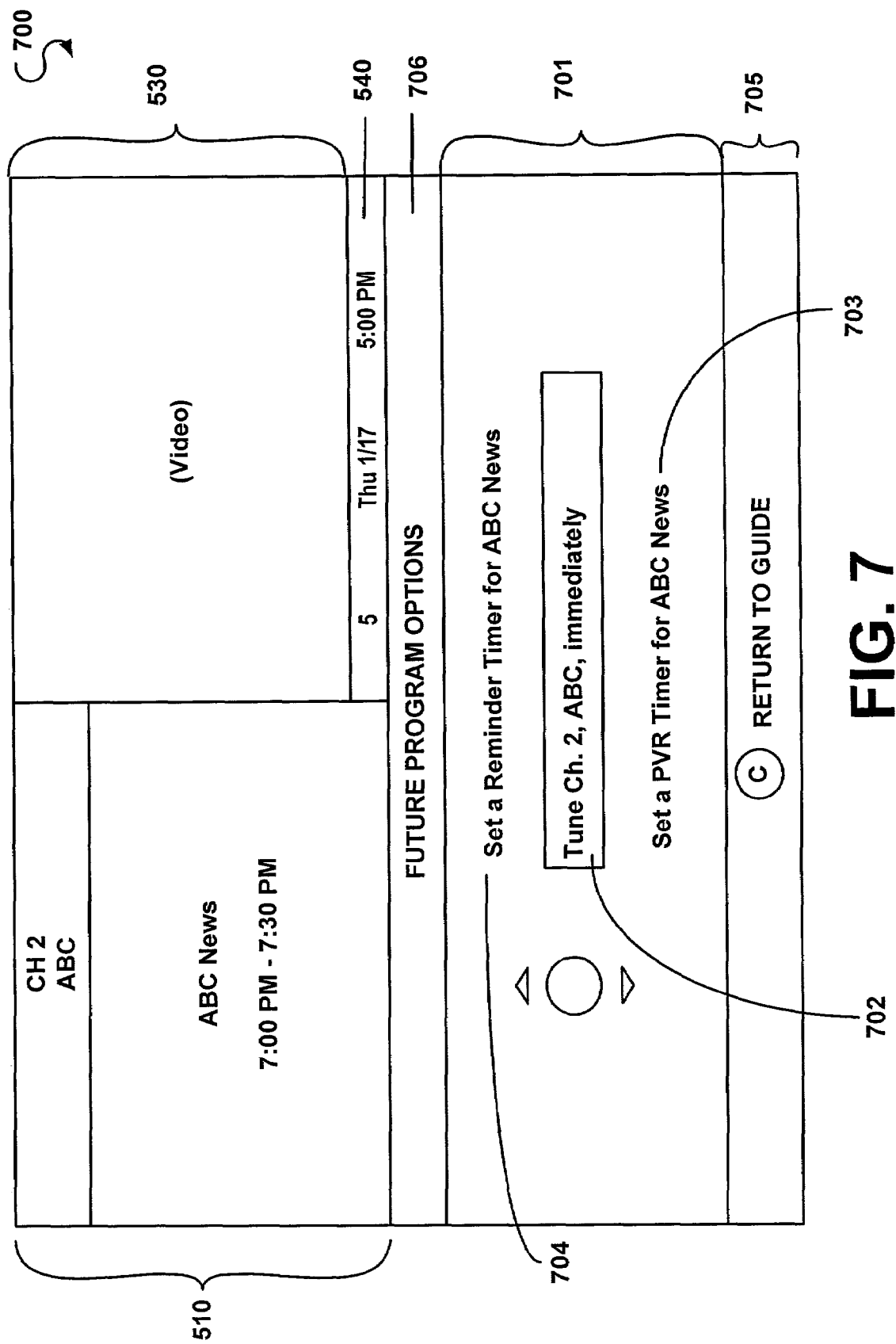
FIG. 7 is an example screen diagram of a Future Program Options screen that may be presented to a user after the user selects a television presentation listing while being presented with the IPG screen depicted in FIG. 6.

FIG. 7 depicts a non-limiting example of a Future Program Options screen 700 that may be presented to a user after the user selects the ABC News listing 520 while being presented with IPG screen 500. A Future Program Options menu 701 gives the user an option to tune to the channel corresponding to ABC News, an option to set a PVR timer to record ABC News, and an option to schedule a reminder banner to be displayed as an overlay window over a full screen program shortly before ABC News is scheduled to start. If the user selects the option to set a PVR timer 703, then the DHCT 200 becomes scheduled to tune to and/or record a television presentation that is carried on the channel corresponding to ABC News (channel 2) during the time period that ABC News is scheduled to be broadcast (7:00 p.m. to 7:30 p.m.). Upon selection of option 703, the Future Program Options menu 701 is removed, and the user is provided with IPG grid 600 indicating that ABC News is scheduled to be recorded. In an alternative embodiment, the user may be presented with a modified Future Program Options screen as illustrated in FIG. 8.

Figure 8:
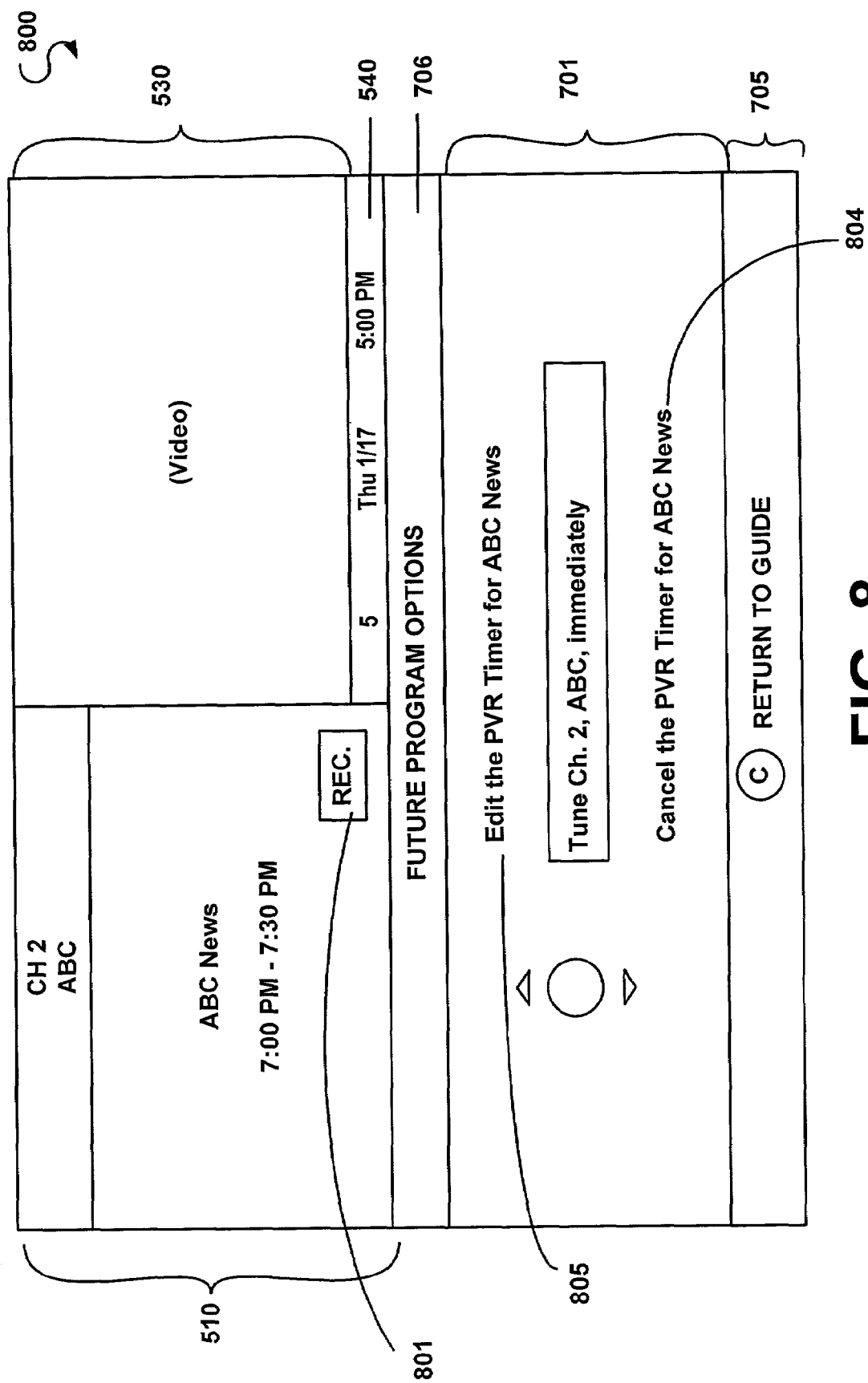
FIG. 8 depicts a non-limiting example of another Future Program Options screen that may be presented to a user after the user selects a recording option while being presented with Future Program Options screen depicted in FIG. 7.

FIG. 8 depicts a non-limiting example of a Future Program Options screen 800 that may be presented to a user after the user selects the recording option 703 while being presented with Future Program Options screen 700 (FIG. 7). The detailed focus area 510 contains a recording symbol 801 indicating that the program identified in the detailed focus area 510 is scheduled to be recorded. The user may select the option 804 to cancel the PVR timer, in which case ABC News will no longer be scheduled to be recorded. Alternatively, the user may select the timer editing option 805 in order to edit the PVR timer corresponding to ABC News.

Figure 9:
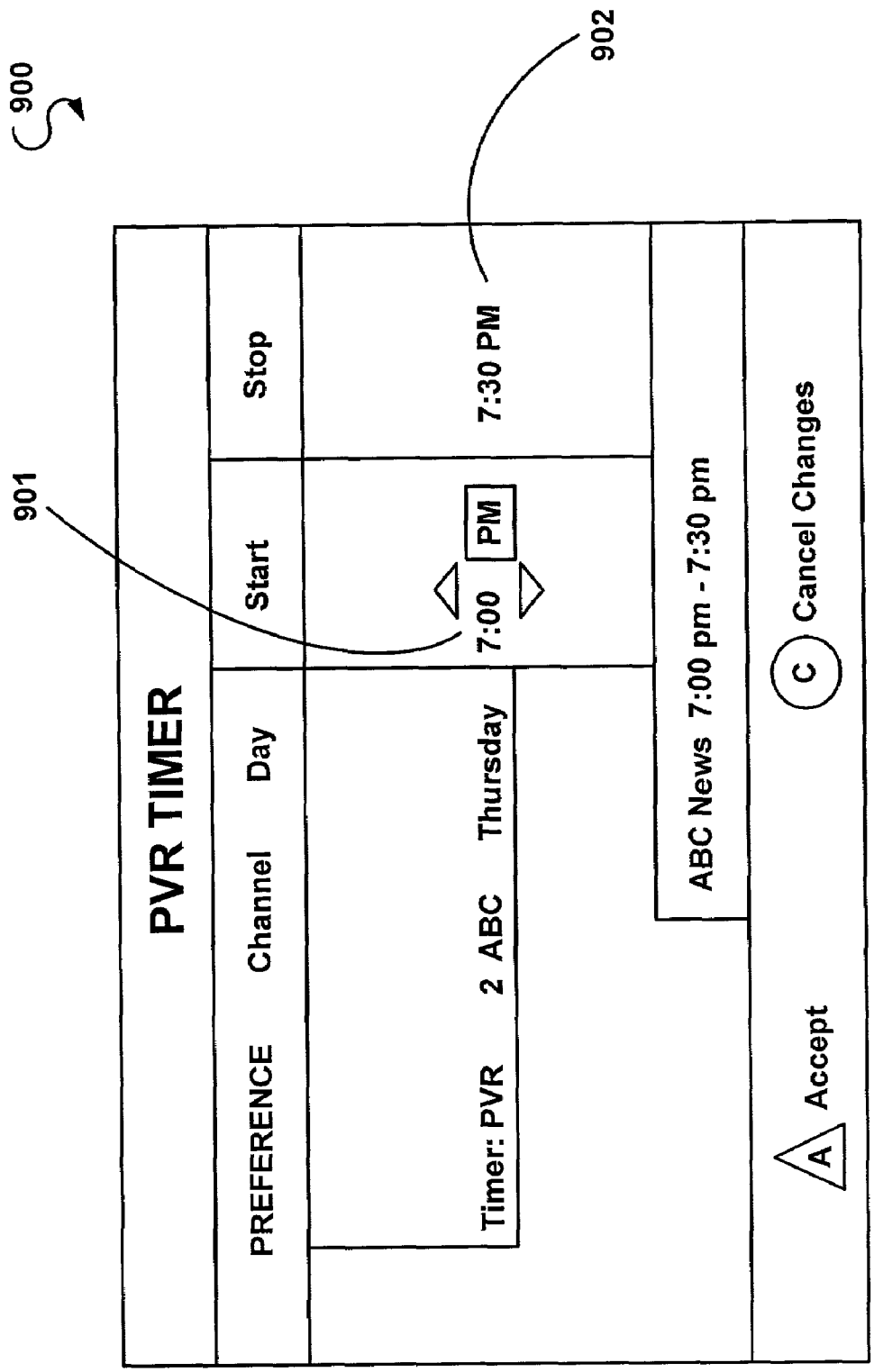
FIG. 9 depicts a non-limiting example of a PVR timer screen that may be presented to a user after the user selects an option to edit a recording timer while being presented with the Future Program Options screen depicted in FIG. 8.

FIG. 9 depicts a non-limiting example of a PVR timer screen 900 that illustrates how PVR timer settings may be edited by a user. The PVR timer screen 900 may be presented to a user after the user selects the timer editing option 805 while being presented with Future Program Options screen 800 (FIG. 8). In another embodiment of the invention, the PVR timer screen 900 may be presented to a user after the user activates the record button 301 while being presented with IPG screen 500(FIG. 5). The user can use the remote control device 300 to send signals to the DHCT 200 that would cause the timer settings listed in the PVR timer screen 900 to be highlighted and changed in accordance with user input. For example, a user may use the left and right arrow buttons 313 and 314 (FIG. 3) in order to highlight a desired time element, and the up and down arrow buttons 311 and 312 in order to change the highlighted time element. The start time 901 listed under the heading START is the time that the PVR is scheduled to start recording and the stop time 902 listed under the heading STOP is the time that the PVR is scheduled to stop recording. By changing these time settings and then pressing the "A" button on the remote control device 300, the PVR recording schedule will be changed accordingly.

Figure 10:
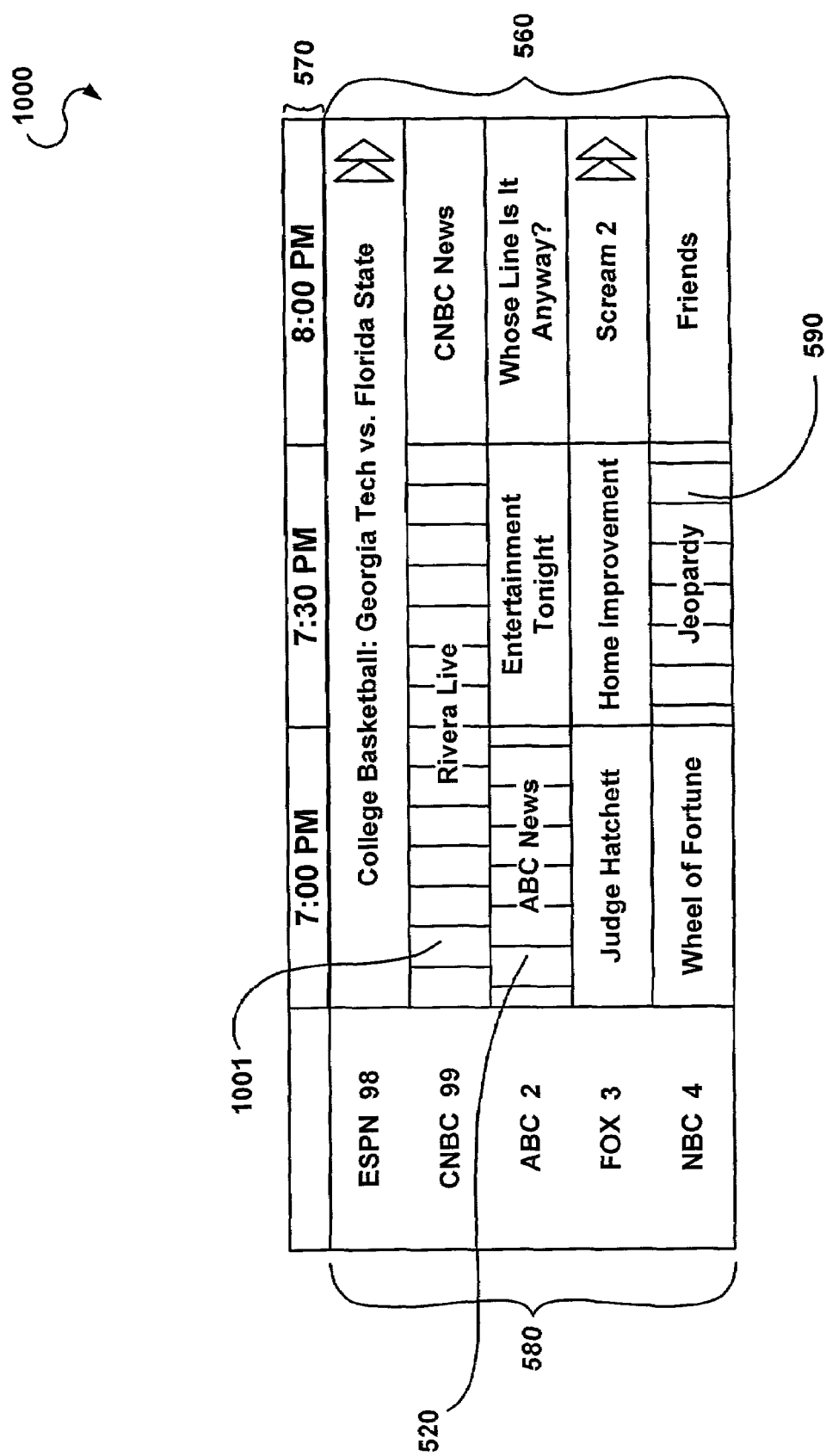
FIG. 10. depicts a non-limiting example of an IPG grid that is presented by the DHCT depicted in FIG. 2 showing a time conflict between scheduled recording.

FIG. 10 depicts a non-limiting example of an IPG grid 1000 that may be presented after the program identified as Jeopardy 590 is scheduled to be recorded. The backgrounds of the Rivera Live listing 1001, the ABC News listing 520, and the Jeopardy listing 590 have a Third Color 403 that is used to signify that each of these programs has a recording time conflict. A television presentation has a recording time conflict if it is scheduled to be recorded during a time period that overlaps a time period during which another television presentation is scheduled to be recorded. In this example, Rivera Live 1001 has a recording time conflict with ABC News 520 and Jeopardy 590, and vice versa. A user may decide to cancel a scheduled recording in light of a recording time conflict. A scheduled recording may be cancelled by highlighting or selecting the scheduled program and then activating a designated remote control button for canceling the scheduled recording. Designated remote control button (s) for canceling a scheduled recording may include, for example, the record key 301 and/or the stop key 302.

Figure 11:
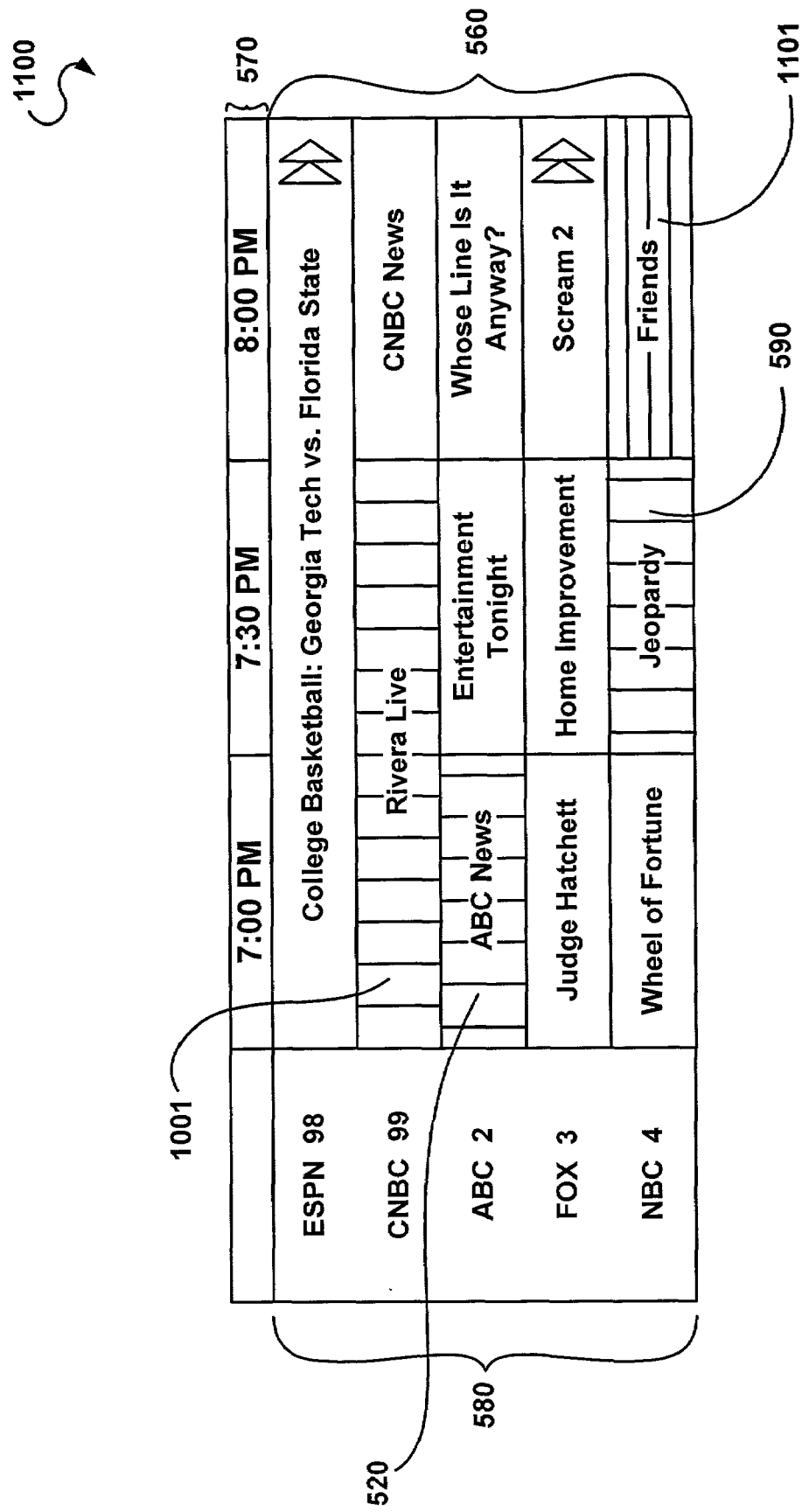
FIG. 11. depicts a non-limiting example of an IPG grid that is presented by the DHCT depicted in FIG. 2 showing a storage capacity conflict associated with a scheduled recording.

FIG. 11 depicts a non-limiting example of an IPG grid 1100 that may be presented after the program identified as Friends 1101 is scheduled to be recorded. The background of the Friends listing 1101 has a Fourth Color 404 (FIG. 4) that is used to signify that Friends has a storage capacity conflict. A storage capacity conflict occurs when there is insufficient storage capacity to store a scheduled recording unless another recording or part thereof is deleted prior or during to the recording of the scheduled recording. In this example, the storage capacity conflict occurs because the programs identified as Rivera Live 1001, ABC News 520, and Jeopardy 590 are expected to occupy enough additional storage capacity that not enough storage capacity will remain for Friends 1101 to be recorded in its entirety unless a recorded program or part thereof is deleted prior to or during the recording of Friends.

Figure 12:
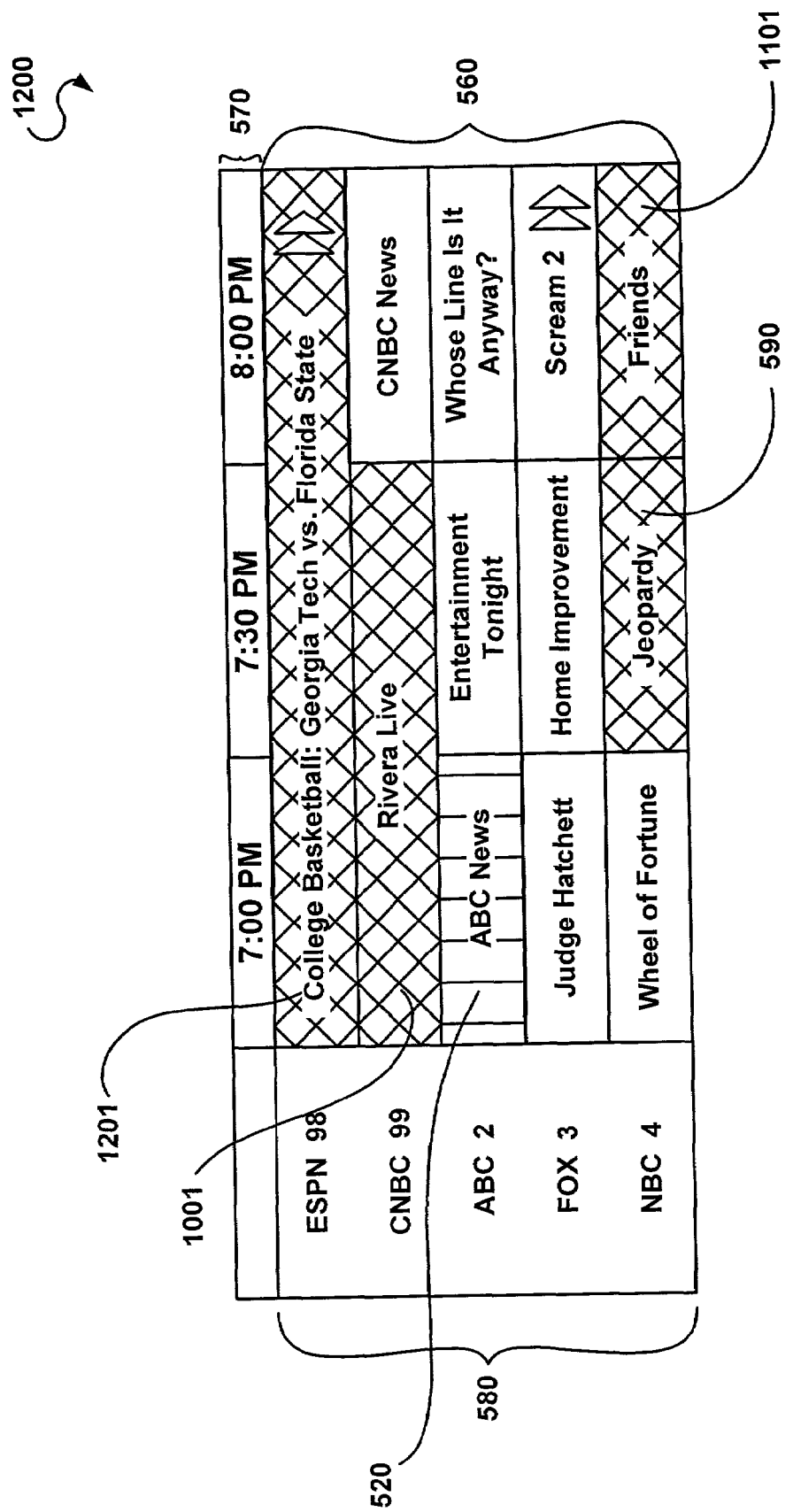
FIG. 12. depicts a non-limiting example of an IPG grid that is presented by the DHCT depicted in FIG. 2 showing a storage capacity conflict and a time conflict associated with a scheduled recording.

FIG. 12. depicts a non-limiting example of an IPG grid 1200 that may be presented after the program identified as College Basketball 1201 is scheduled to be recorded. The background of the College Basketball listing 1201 has a Fifth Color 405 that is used to signify that College Basketball 1201 has a storage capacity conflict and a recording time conflict. In this example, a storage capacity conflict occurs because the programs identified as Rivera Live 1001, ABC News 520, and Jeopardy 590 are expected to occupy enough additional storage capacity that not enough storage capacity will remain for College Basketball 1201 to be recorded in its entirety unless a recorded program or part thereof is deleted prior to or during the recording of College Basketball. Furthermore, a time conflict occurs because the programs identified as Rivera Live 1001, ABC News 520, Jeopardy 590, and Friends 1101 are scheduled to be recorded during a time period that overlaps the time period during which College Basketball 1201 is scheduled to be recorded. Note that the listings for Rivera Live 1001, Jeopardy 590, and Friends 1101 also comprises a Fifth Color 405 that is used to signify that these listings have a storage capacity conflict and a recording time conflict. Note that the ABC News listing 520 has a Third Color 403 (FIG. 4) that is used to signify that ABC News has a time conflict with one or more other listings.

Figure 13:
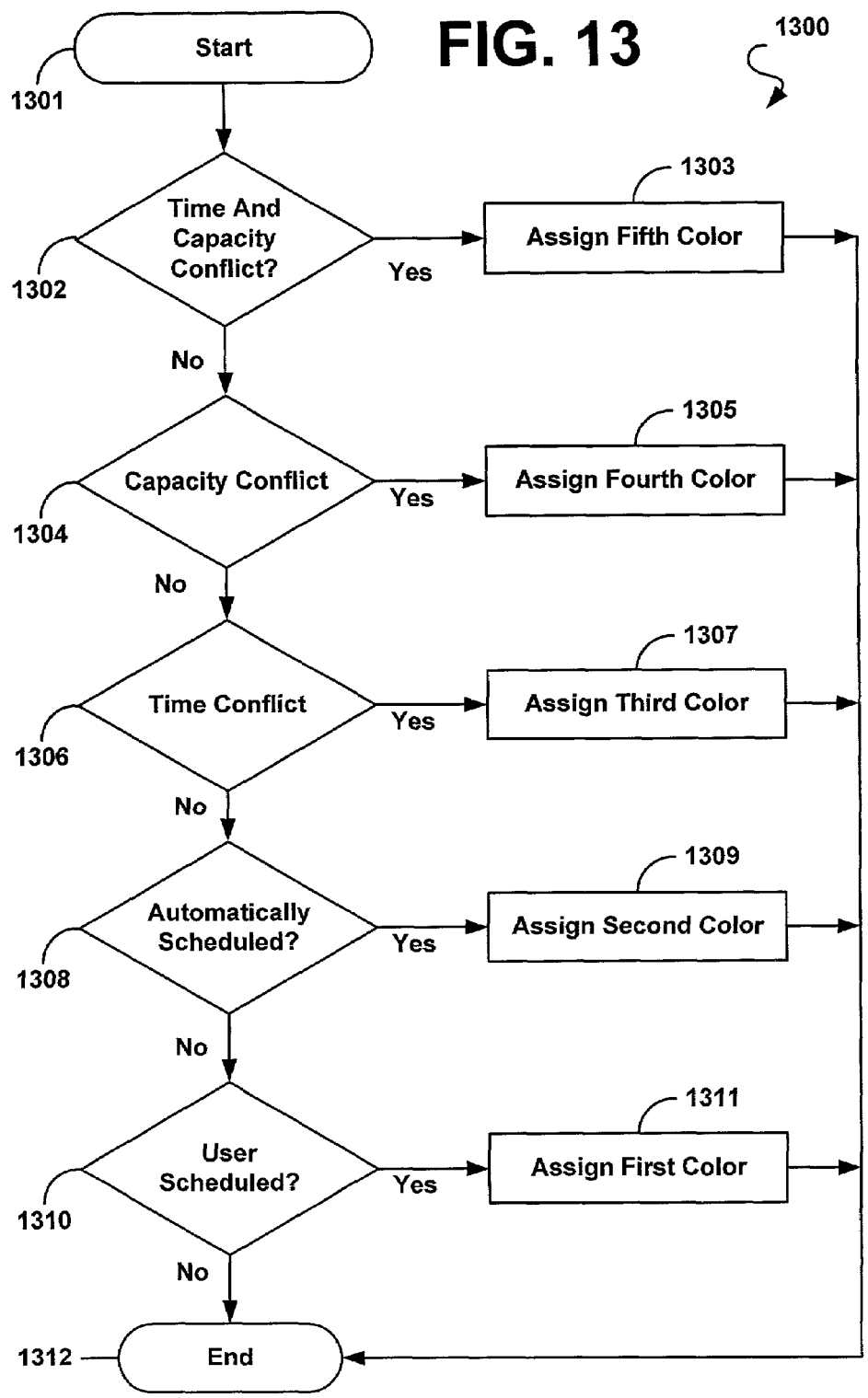
FIG. 13 is a flow chart depicting a non-limiting example of a routine for assigning colors to television presentation listings in an IPG that may be presented by the DHCT depicted in FIG. 2.

FIG. 13 is a flow chart depicting a non-limiting example of a routine 1300 that may be used to assign colors to recording listings. The routine 1300 may be initiated before each IPG listing is displayed and/or after a recording is scheduled. After the routine 1300 is initiated at step 1301, the routine 1300 determines if a listed program has a recording time and storage capacity conflict with another program. If the listed program has a recording time and storage capacity conflict with another program, then the routine 1300 assigns in step 1303 a Fifth Color 405 (FIG. 4) to the listed program and the routine 1300 terminates as indicated in step 1312.

If the listed program does not have a recording time and storage capacity conflict with another program, then the routine 1300 determines in step 1304 if the listed program has a storage capacity conflict with another program. If the listed program has a storage capacity conflict with another program, then the routine 1300 assigns in step 1305 a Fourth Color 404 to the listed program and the routine 1300 terminates as indicated in step 1312.

If the listed program does not have a storage capacity conflict with another program, then the routine 1300 determines in step 1306 if the listed program has a recording time conflict with another program. If the listed program has a recording time conflict with another program, then the routine 1300 assigns in step 1307 a Third Color 303 to the listed program and the routine 1300 terminates as indicated in step 1312.

If the listed program does not have a recording time conflict with another program, then the routine 1300 determines in step 1308 if the listed program was automatically scheduled to be recorded by the DHCT 200. If the listed program was automatically scheduled, then the routine 1300 assigns in step 1309 a Second Color 402 to the listed program and the routine 1300 terminates as indicated in step 1312.

If the listed program was automatically scheduled to be recorded, then the routine 1300 determines in step 1310 if the listed program was scheduled to be recorded by a user. If the listed program was scheduled to be recorded by a user, then the routine 1300 assigns in step 1311 a First Color 401 to the listed program and the routine 1300 terminates as indicated in step 1312.

Any blocks or steps shown in FIG. 13 represent modules, segments, or portions of code which include one or more executable instructions for implementing specific logical functions or steps in a process. Alternate implementations are included within the scope of the preferred embodiment of the present invention in which functions or steps may be executed out of order from that shown or discussed, including substantially concurrently or in reverse order, depending on the functionality involved, as would be understood by those reasonably skilled in the art. For example, step 1304 may be executed before step 1306. Similarly, step 1310 may be executed before step 1308.

It will also be appreciated by those skilled in the art that the functionality provided by the routine 1300, can also be implemented through hardware (e.g., an application specific integrated circuit (ASIC) and supporting circuitry). Each implementation has its advantages, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

Further, the functionality provided by the routine 1300, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

Figure 14:
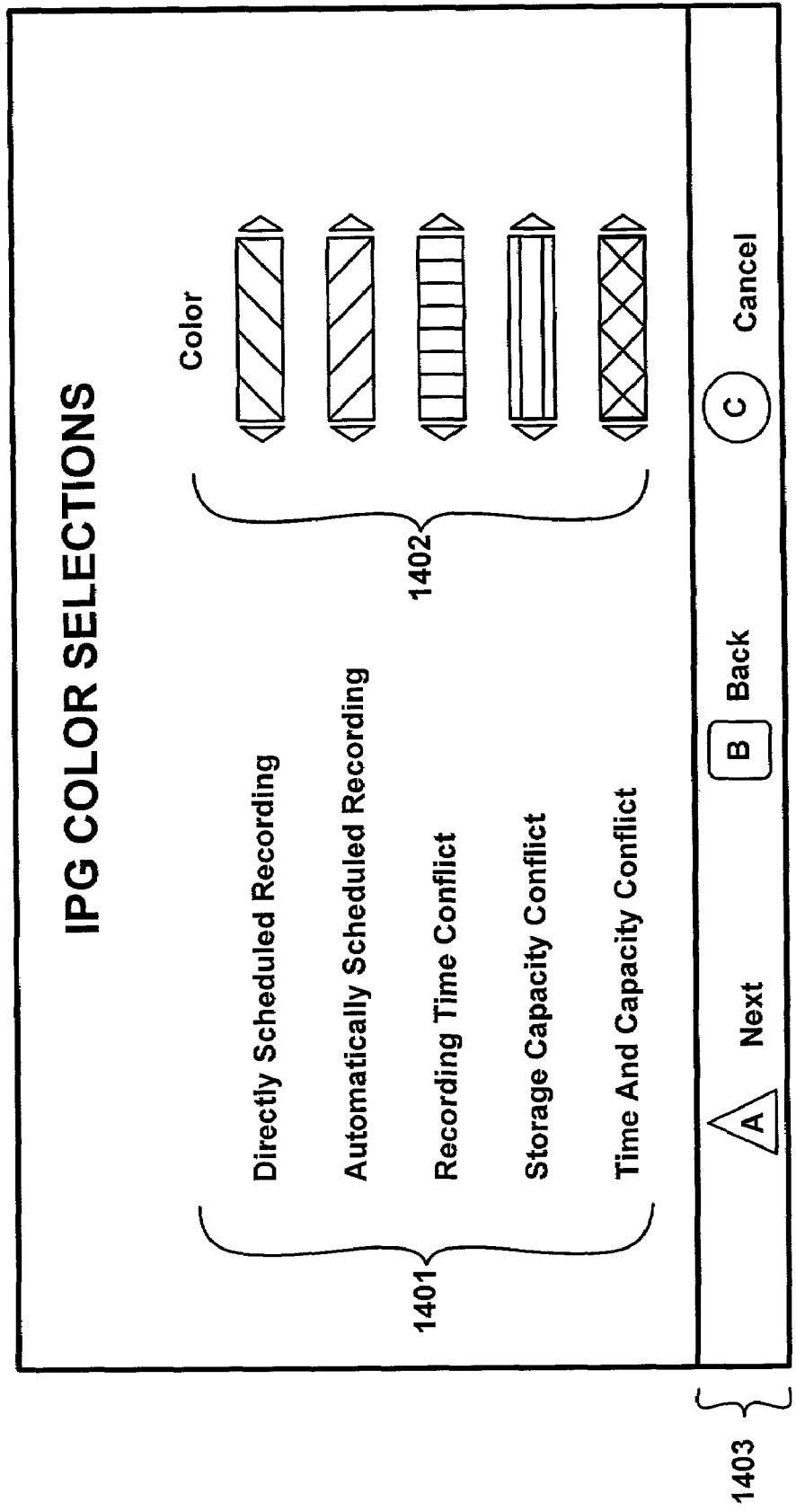
FIG. 14 depicts a non-limiting example of an IPG color selection screen that may be used by a user and/or a system operator to select colors for designating characteristics of television presentation listings in an IPG that may be presented by the DHCT depicted in FIG. 2.

FIG. 14 depicts a non-limiting example of an IPG color selection screen 1400 that may be used by a user and/or a system operator to select colors for designating characteristics of program listings. The IPG color selection screen 1400 includes a list of program listing characteristics 1401 and a list of color entry fields 1402. Each of the entry fields 1402 may be used to designated a color for a respective program listing characteristic. In one possible implementation, a user may use the up and down arrow keys 311 and 312 to highlight a desired color selection field, and may then use the left and right arrow keys 313 and 314 to select a desired color. A navigation instruction section 1403 provides information about the functionality of selected remote control buttons.

Figure 15:
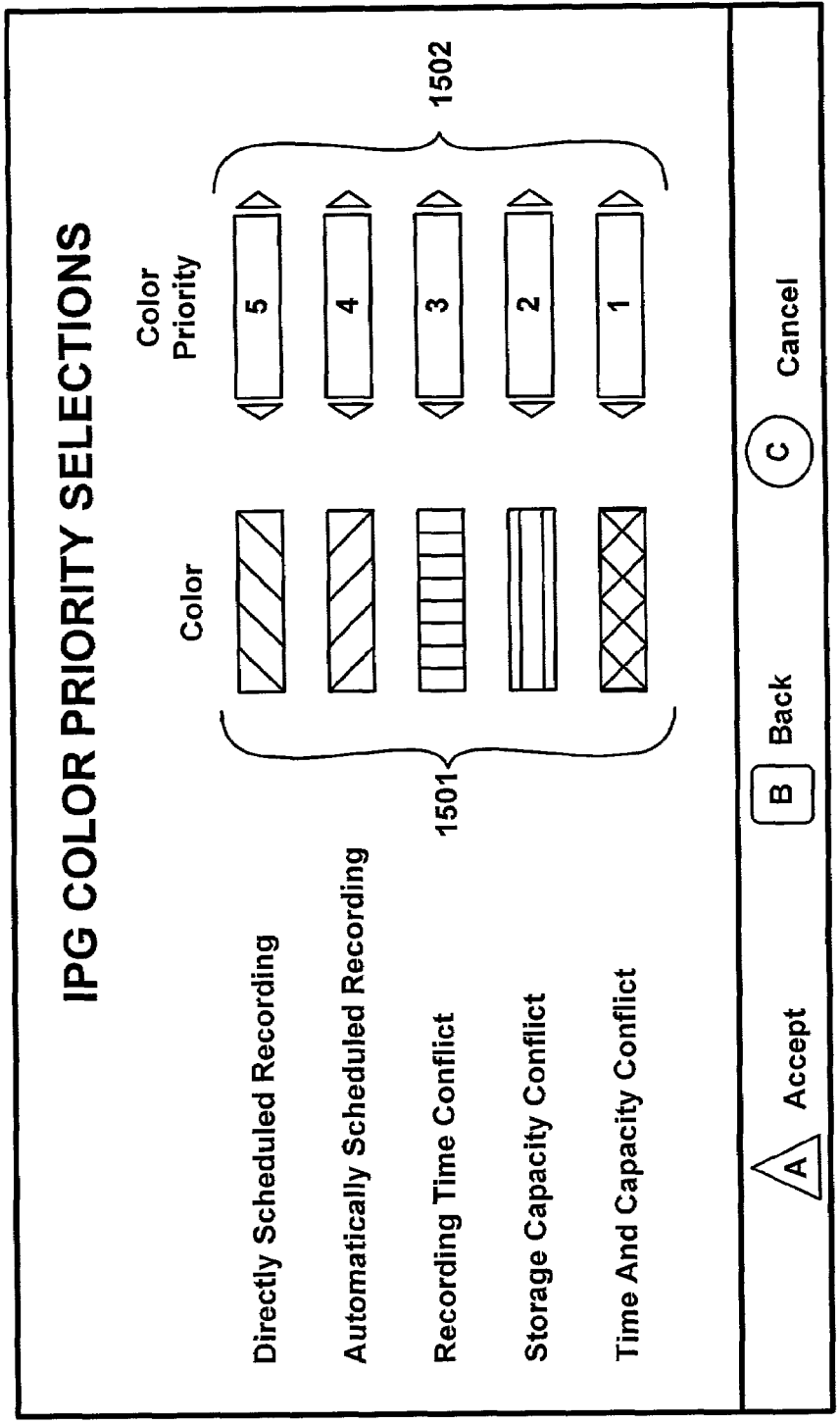
FIG. 15 depicts a non-limiting example of an IPG color priority selection screen that may be used by a user and/or a system operator to select priorities for colors used in IPG listings that may be presented by the DHCT depicted in FIG. 2.

FIG. 15 depicts a non-limiting example of an IPG color priority selection screen 1500 that may be used by a user and/or a system operator to select priorities for IPG listing colors. The IPG color priority selection screen 1500 includes a list of program listing colors 1501 and a list of priority entry fields 1502. Each of the entry fields 1502 may be used to designated a priority for a respective program listing color. The priority entries may subsequently be used to assign a color to a program listing that has multiple recording characteristics for which different colors may be assigned. For example, a user may assign a top priority (1) to a color corresponding to time and capacity conflicts and a lowest priority (5) to a color corresponding to user scheduled recordings. In this manner if a user scheduled recording has a time and capacity conflict, it would be assigned the color corresponding to time and capacity conflicts, and not the color corresponding to user scheduled recordings.

Figure 16:
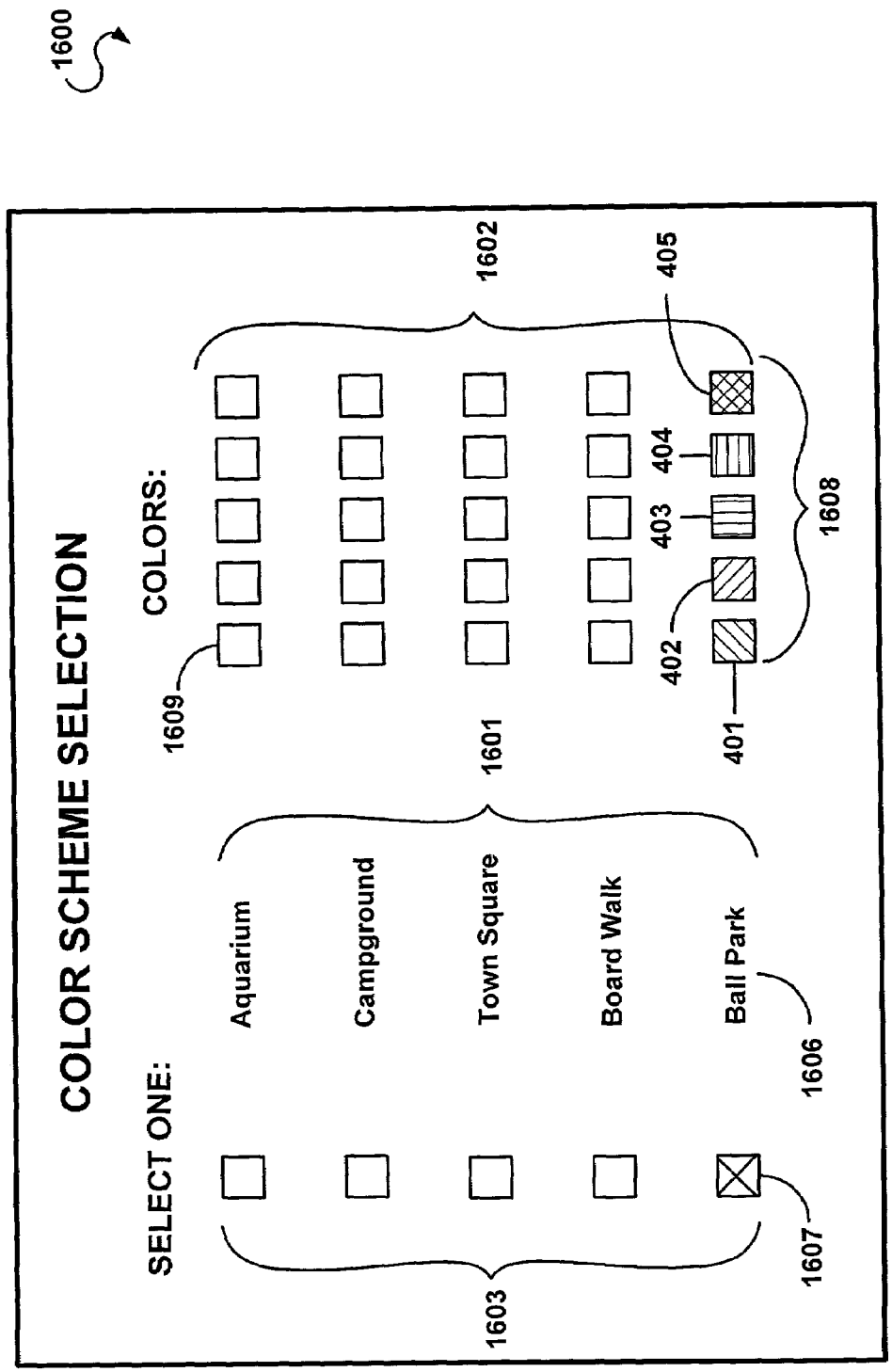
FIG. 16 depicts an example color scheme selection screen that a system operator may use to supply color scheme information for determining the colors of various IPG recording listings that may be presented by the DHCT depicted in FIG. 2.

FIG. 16 depicts a non-limiting example of a color scheme selection screen 1600 that a system operator may use to supply color scheme information for determining the colors of various IPG recording listings. The color scheme selection screen 1600 includes a list of color schemes 1601, a list of respective color charts 1602, and a group of selection boxes 1603. Each color scheme is assigned a pre-determined name and is associated with a pre-determined set of color selections. The color charts 1602 inform the system operator of the colors used in the various color schemes. A system operator may select a selection box corresponding to the desired color scheme. The selection made by the system operator is communicated to a headend 110, then forwarded to multiple DHCTs 200 where it is implemented by IPG applications 224. In the current example, the "Ball Park" color scheme 1606 is shown as having been selected, as indicated in selection box 1607. The Ball Park color scheme 1606 has a color chart 1608 that shows the colors that are used in the color scheme 1606. The color chart 1608 includes the colors 401, 402, 403, 404, and 405. Each of the colors in the color chart 1608 represents a color that will be used to provide information on a scheduled recording as part of the selected color scheme 1606. Although not depicted in FIG. 16, each of the boxes 1609 in the list of color charts 1602 includes a color that is part of a corresponding color scheme.

FIG. 17 depicts a non-limiting example of a PVR recording listing screen 1700 that may be used to provide a user with information about scheduled recordings. The PVR recording listing screen 1700 may be presented after a user activates the PVR key 395 (FIG. 3) while being presented with IPG grid 1200 (FIG. 12). The PVR recording listing screen 1700 comprises four columns: a first column 1701 contains a list of program titles of scheduled recordings, a second column 1702 contains a list of respective channels, a third column 1703 contains a list of respective recording times, a fourth column 1704 contains a list of respective recording dates. Each of the recording listings in the first column 1701 is assigned a color that indicates a corresponding characteristic. In this example, recording listings 1705-1708 are assigned a Fifth Color 405 indicating that they have a recording time conflict and a storage capacity conflict, recording listing 1709 is assigned a Third Color 403 indicating that it has a recording time conflict, and recording listings 1710 and 1711 are assigned a Fourth Color 404 indicating that they have a storage capacity conflict. In one embodiment of the invention, a scheduled recording may be cancelled by highlighting or selecting the corresponding listing and then activating a designated remote control button for canceling the scheduled recording.

It should be emphasized that the above-described embodiments of the present invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method that is implemented via a digital home communication terminal for managing television presentation recordings comprising:
   determining if a television presentation corresponding to a television presentation listing is scheduled to be recorded;
   assigning a first color to the television presentation listing if the television presentation is scheduled to be recorded, wherein the color can be selected from a selectable option by a user;
   determining whether the television presentation has a time scheduling conflict with another television presentation that is scheduled to be recorded;
   assigning a second color responsive to determining that the television presentation has a time scheduling conflict with the another television presentation that is scheduled to be recorded; and
   presenting the television presentation listing as part of an interactive program guide (IPG) having the second color as a background color for the television presentation listing, wherein the IPG includes a main program display area that contains the television presentation listing that is assigned the second color and information corresponding to the availability of the television presentation listing for viewing during at least one time period.

2. The method of claim 1, wherein the color is used as a foreground color for the television presentation listing.

3. The method of claim 1, wherein the color is determined based on a color scheme.

4. The method of claim 1, wherein the color is determined based on whether the television presentation was scheduled to be recorded by a user.

5. The method of claim 1, wherein the color is determined based on a television presentation storage capacity that is expected to be available.

6. The method of claim 1, wherein the color is determined based on whether data will need to be deleted from a data storage device in order for the television presentation to be recorded in its entirety.

7. The method of claim 1, wherein the scheduling of the recording of the television presentation is edited in response to receiving input from a user while the user is being presented with the television listing.

8. The method of claim 1, wherein the scheduling of the recording of the television presentation is resolved of data storage conflict in response to receiving input from a user while the user is being presented with the television listing.

9. The method of claim 1, wherein the scheduling of the recording of the television presentation is resolved of a time scheduling conflict in response to receiving input from a user while the user is being presented with the television listing.

10. The method of claim 1, wherein the scheduling of the recording of the television presentation is cancelled in response to receiving input from a user while the user is being presented with the television listing, wherein the user input corresponds to the activation of one of a record button, a stop button, and a select button.

11. The method of claim 10, wherein the television presentation listing is highlighted at the time that the input is received.

12. The method of claim 1, wherein the scheduling of the recording of the television presentation was implemented in response to receiving input from a user while the user was being presented with the television listing, wherein the user input corresponds to the activation of one of a record button and a select button.

13. The method of claim 12, wherein the television presentation listing is highlighted at the time that the input is received.

14. The method of claim 1, wherein the television presentation listing is presented via a television as part of a list of recorded television presentations.

15. The method of claim 1, wherein the television presentation listing is presented via a television as part of a list of scheduled program recordings.

16. The method of claim 1, wherein the method is implemented via a digital home communication terminal (DHCT).

17. The method of claim 1, further comprising presenting an IPG color selection screen for selecting colors for designating characteristics of the television presentation listing.

18. The method of claim 1, further comprising presenting an IPG color priority selection screen for selecting priorities for IPG listing colors.

19. The method of claim 1, further comprising presenting a color scheme selection screen for supplying color scheme information that determines the colors of various IPG recording listings.

20. The method of claim 1, further comprising presenting a recording listing screen that provides information about scheduled recordings, the information including one of recording time conflict and storage capacity conflict.

21. A system for managing television presentation recordings comprising:
determination logic for determining if a television presentation corresponding to a television presentation listing is scheduled to be recorded;
assignment logic for assigning a color to the television presentation listing in response to the determination logic determining that the television presentation is scheduled to be recorded and has a time scheduling conflict with another television presentation that is scheduled to be recorded, wherein the color can be selected from a selectable option by a user; and
presentation logic for presenting the television presentation listing having the color that indicates that the television presentation has the time scheduling conflict and is scheduled to be recorded, the television presentation listing being presented as part of a requested interactive program guide (IPG), wherein the IPG includes a main program display area that contains the television presentation listing that is assigned the color and information corresponding to the availability of the television presentation listing for viewing during at least one time period.

22. The system of claim 21, wherein the color is used as a background color for the television presentation listing.

23. The system of claim 21, wherein the color is used as a foreground color for the television presentation listing.

24. The system of claim 21, wherein the color is determined based on a color scheme.

25. The system of claim 21, wherein the color is determined based on whether the television presentation was scheduled to be recorded by a user.

26. The system of claim 21, wherein the color is determined based on a television presentation storage capacity that is expected to be available.

27. The system of claim 21, wherein the color is determined based on whether data will need to be deleted from a data storage device in order for the television presentation to be recorded in its entirety.

28. The system of claim 21, wherein the television listing is presented to the user.

29. The system of claim 28, wherein the scheduling of the recording of the television presentation is cancelled in response to receiving input from a user while the user is being presented with the television listing, wherein the user input corresponds to the activation of one of a record button, a stop button, and a select button, wherein the television presentation listing is highlighted at the time that the input is received.

30. The system of claim 28, wherein the scheduling of the recording of the television presentation was implemented in response to receiving input from a user while the user was being presented with the television listing.

31. The system of claim 30, wherein the user input corresponds to the activation of one of a record button and a select button.

32. The system of claim 31, wherein the television presentation listing is highlighted at the time that the input is received.

33. The system of claim 28, wherein the television presentation listing is presented via a television as part of a list of recorded television presentations.

34. The system of claim 21, wherein the system is a digital home communication terminal (DHCT).

35. The system of claim 21, further comprising presentation logic for presenting an IPG color selection screen for selecting colors for designating characteristics of the television presentation listing.

36. The system of claim 21, further comprising presentation logic for presenting an IPG color priority selection screen for selecting priorities for IPG listing colors.

37. The system of claim 21, further comprising presentation logic for presenting a color scheme selection screen for supplying color scheme information that determines the colors of various PG recording listings.

38. The system of claim 21, further comprising presentation logic for presenting a recording listing screen that provides information about scheduled recordings, the information including one of recording time conflict and storage capacity conflict.

39. A method for managing television presentation recordings comprising:
presenting selectable options for selecting and assigning colors to a television presentation listing that is scheduled to be recorded;
determining if the television presentation corresponding to a television presentation listing is scheduled to be recorded;
assigning a color to the television presentation listing if the television presentation is scheduled to be recorded; and
presenting the television presentation listing as part of an interactive program guide (IPG) having the color as a background color for the television presentation listing, wherein the IPG includes a main program display area that contains the television presentation listing that is assigned the color and information corresponding to the availability of the television presentation listing for viewing during at least one time period.

40. The method of claim 39, wherein assigning a color can be accomplished by a subscriber.

41. The method of claim 39, wherein assigning a color can be accomplished by a system operator.

42. The method of claim 39, wherein presenting the selectable option comprises presenting an IPG color selection screen for selecting colors for designating characteristics of the television presentation listing, the designating characteristics including scheduled recording, recording time conflict, storage capacity conflict, and time and capacity conflict.

43. The method of claim 42, wherein presenting the selectable options comprises presenting an IPG color priority selection screen for selecting priorities for the colors selected to be assigned to the designating characteristics of the television presentation listing.

44. The method of claim 39, wherein presenting the selectable options comprises presenting a color scheme selection screen for supplying color scheme information that determines the colors of various IPG recording listings.

45. The method of claim 39, wherein presenting the selectable options comprises presenting a recording listing screen that provides information about scheduled recordings, the information including one of recording time conflict and storage capacity conflict.

* * * * *